United States Patent

[11] 3,563,421

| [72] | Inventors | Harold F. Coates<br>Hatboro;<br>Samuel J. Greger, Glenside, Pa. |
|---|---|---|
| [21] | Appl. No. | 751,502 |
| [22] | Filed | Aug. 9, 1968 |
| [45] | Patented | Feb. 16, 1971 |
| [73] | Assignee | Standard Pressed Steel Co.<br>Jenkintown, Pa.<br>a corporation of Pennsylvania |

[54] VIBRATING MECHANISM
5 Claims, 3 Drawing Figs.

[52] U.S. Cl. .................................................. 222/196,
259/1
[51] Int. Cl. ................................................. B65g 65/70
[50] Field of Search ........................................... B01f/15/00;
259/1 (Vibrator Fluid), 2, 72; 222/196, 200;
198/(Inquired)

[56] References Cited
UNITED STATES PATENTS

| 2,535,596 | 12/1950 | Peterson | 259/1 |
| 2,778,612 | 1/1957 | Peterson | 259/1 |
| 2,793,009 | 5/1957 | Peterson | 259/1 |
| 2,917,290 | 12/1959 | Peterson | 259/1 |
| 3,056,589 | 10/1962 | Daniel | 259/1 |
| 3,123,302 | 3/1964 | Drayer | 259/1X |
| 3,463,458 | 8/1969 | Becker | 259/1 |

*Primary Examiner*—Robert W. Jenkins
*Attorney*—Stanley Belsky

ABSTRACT: A vibrating mechanism in the form of a ring housing arranged to be mounted on a delivery tube through which parts pass. A circular passage is provided in the ring housing and a freely movable ball is located within the passage. Air, under pressure, is supplied through an opening leading into the circular passage to cause the ball to whirl around the passage and hit against the walls of the passage. An exhaust opening is provided to permit the air to leave the passage.

PATENTED FEB 16 1971

3,563,421

INVENTOR.
HAROLD F. COATES
BY SAMUEL J. GREGER

Andrew L. Ney 3,563,421

VIBRATING MECHANISM

The present invention relates, in general, to agitating mechanisms and, in particular, to a vibrator adapted to a mounted on a feed chute or delivery tube to prevent congestion of parts passing through the chute or tube.

Various pieces of automatic equipment are available at the present time which employ feed chutes or delivery tubes through which articles pass from a storage hopper to a station at which these articles are installed in a workpiece. Often, because of the configuration of these articles and the speed at which they must be supplied, the articles jam or become congested within the delivery tube. Various complex and expensive proposals have been made in the past to overcome the problem of congestion of parts in these tubes. The present invention provides a vibrating mechanism which solves this problem in a simple and inexpensive manner.

Accordingly, it is an object of the present invention to provide a new and improved vibrating mechanism.

It is another object of the present invention to provide a vibrating mechanism which is simple in construction an inexpensive to fabricate.

These objects, as well as others, are achieved according to a preferred embodiment of the present invention by providing a ring-shaped housing having an enclosed passage within which is located a freely movable ball. The housing is arranged so that it may be mounted on a delivery tube with the tube extending through the center of the housing. A pair of openings is provided in the wall of the housing and extend into the interior of the housing. The first opening serves as a conduit to supply air under pressure into the housing to cause the ball to whirl around the passage inside the housing. The second opening serves as an air exhaust port. As the ball whirls around the housing, it strikes against the walls of the housing setting up vibrations within a tube upon which the housing is mounted.

For a better understanding of the present invention, together with other and further objects thereof, reference is made to the following description, taken in connection with the accompanying drawing, and its scope will be pointed out in the appended claims.

Referring to the drawing.

Figure 1:
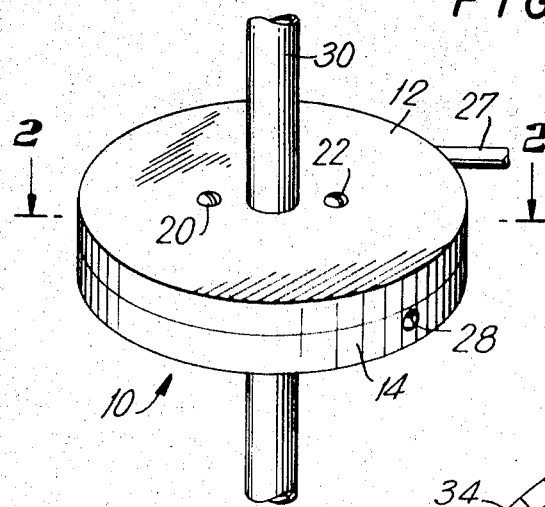
FIG. 1 is a perspective view illustrating a vibrating mechanism constructed in accordance with the present invention mounted upon an article delivery tube.
Figure 2:
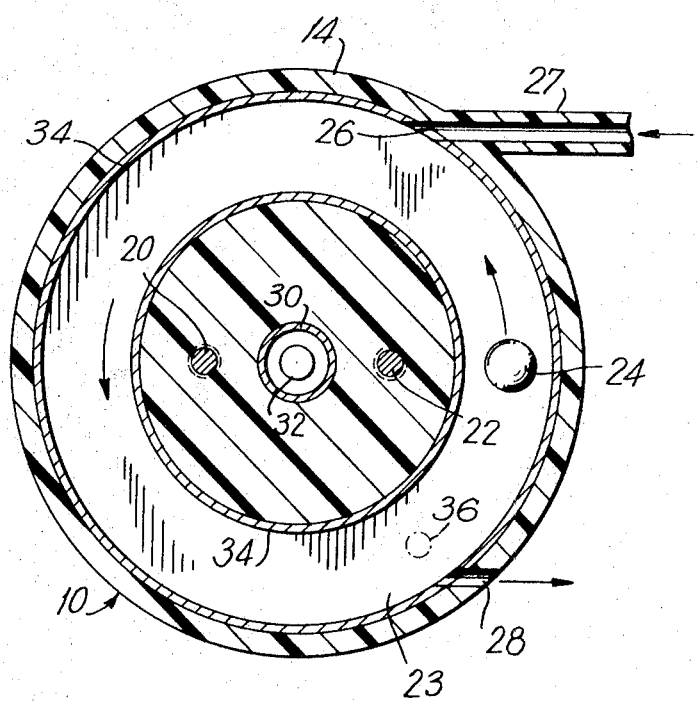
FIG. 2 is a horizontal section taken along line 2-2 of FIG. 1.
Figure 3:
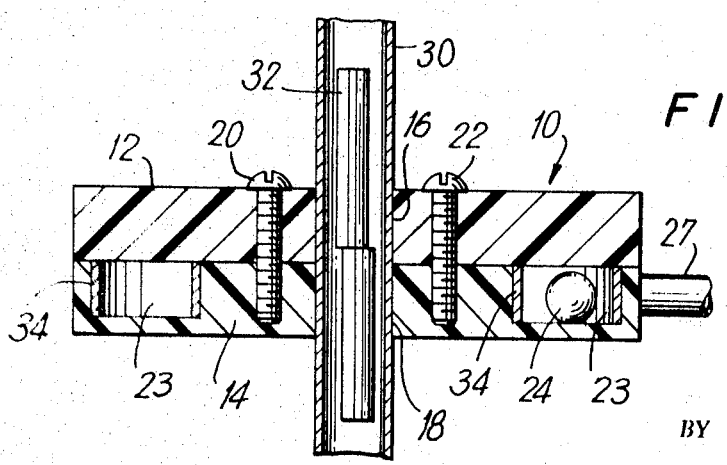
FIG. 3 is a vertical section of the mechanism illustrated in FIG. 1.

Referring to the drawing, a vibrating mechanism constructed in accordance with the present invention includes a housing 10 in the form of a ring. For the embodiment of the invention illustrated, housing 10 is composed of top and bottom sections 12 and 14 having aligned, central apertures 16 and 18, respectively which form a central passage through the housing. The two sections of the housing are held together by two screws 20 and 22. Top and bottom sections 12 and 14 of the housing are arranged to provide a raceway or passage 23 within the housing. In particular, section 14 is provided with an annular groove of rectangular cross section which is enclosed to form passage 23 when sections 12 and 14 are brought together. As best illustrated in FIG. 2, the sidewalls of passage 23 are formed by two concentric circles.

Located within passage 23 is a ball 24. The size of this ball is such as to permit it to be freely movable within passage 23.

A pair of openings 26 and 28 extend through the wall of housing 10 into passage 23. Opening 26 serves as a conduit to feed air under pressure into passage 23 in housing 10, while opening 28 serves as an exhaust port. As air is supplied through opening 26, ball 24 is caused to whirl around passage 23 counterclockwise as viewed in FIG. 2. In order to confine the movement of ball 24 to passage 23 and to prevent the ball from entering either of the openings 26 or 28, the diameter of the ball is made greater than the minimum cross-sectional dimension of both of the openings 26 and 28.

In the preferred embodiment of the invention illustrated in the drawing, the center line of opening 26 is nonradial relative to the circle defining the inner wall of passage 23. In particular, the center line of this opening is tangent to a circle having a diameter greater than the diameter of the circle defining the inner wall of passage 23. This disposition of opening 26 provides the desired flow of air to move ball 24 around passage 23. A tubular extension 27 provides an extended length aligned with opening 26 along which air is supplied to impart the desired flow to the air.

The center line of exhaust opening 28 also is tangent to a circle between the inner and outer walls of passage 23 to provide the desired "bleeding" of the air supplied into passage 23. For the embodiment of the invention illustrated, the center lines of openings 26 and 28 are parallel. In addition, the two openings are spaced apart approximately 300°, when taken in the direction of movement of the ball 24, to provide a path of sufficient length over which the air is confined in passage 23.

In operation, the vibrating mechanism of the invention is mounted on a delivery tube 30 which, for the example illustrated, serves to supply spring pins 32 from a storage hopper (not shown) to a station (also not shown) at which the spring pins are inserted into workpieces. The diameter of the central passage through housing 10 is selected so that the housing fits tightly on delivery tube 30. As a result, with air supplied into passage 23 through opening 26, ball 24 whirls around the passage 23 hitting the inner and outer walls of this passage. The banging of the ball against the walls of the passage is transmitted to delivery tube 30 and causes the delivery tube to undergo slight vibratory movements. As a result, the spring pins 32 passing through the delivery tube, in turn, are agitated to assure their smooth, continuous movement through the delivery tube.

Although, for the embodiment of the invention illustrated in the drawing, the top and bottom sections 12 and 14 of the housing are represented as being made of a plastic material, it is apparent that other materials may be employed. It has been found that in certain applications when the housing is made from a plastic or like material, metallic linings 34 along the sides of raceway 23 may be desirable to protect these walls of the raceway.

Although the exhaust opening 28 has been shown as extending through a sidewall of the housing, the location of this opening may be at a different position. For example, the exhaust opening may extend through the bottom wall of the raceway such as is shown by dotted lines 36 so that the center line of this opening is parallel to the axis of the housing, while the center line of inlet opening 26 is in a plane which is perpendicular to the axis of the housing.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

We claim:

1. A vibrating mechanism comprising:

A housing formed of a first member and a second member in face-to-face relationship and having an annular passage formed therein, a pair of openings extending from outside said housing into said passage, a central aperture extending axially through said first and second members, said central aperture being adapted to receive a delivery tube, and means located adjacent said central aperture securing said first and second members in face-to-face relationship; and a freely moveable ball within said passage having a diameter greater than the minimum cross-sectional dimension of said openings into said passage.

2. A vibrating mechanism according to claim 1 wherein said passage is of rectangular cross section.

3. A vibrating mechanism according to claim 1 wherein said first member has an annular groove formed therein and said second member has a flat face overlying said first member to enclose said groove and define said annular passage.

4. A vibrating mechanism according to claim 3 wherein said groove is defined by two concentric circles and the center lines of said openings into said passage are tangent to a third circle having a diameter greater than the diameter of the smaller of said two concentric circles.

5. A vibrating mechanism according to claim 3 wherein said first and said second members are made of a plastic material and the sidewalls of said groove are lined with a metallic material.